(12) United States Patent
Thiagarajan et al.

(10) Patent No.: US 11,121,787 B2
(45) Date of Patent: Sep. 14, 2021

(54) METHOD, SYSTEM AND APPARATUS FOR CALIBRATION OF PHASED ARRAY RADIO FREQUENCY TRANSCEIVER

(71) Applicant: MMRFIC Technology Pvt. Ltd., Bangalore (IN)

(72) Inventors: Ganesan Thiagarajan, Bengaluru (IN); Saravanakumar Ganeshan, Bengaluru (IN)

( * ) Notice: Subject to any disclaimer, the term of this patent is extended or adjusted under 35 U.S.C. 154(b) by 0 days.

(21) Appl. No.: 16/568,285

(22) Filed: Sep. 12, 2019

(65) Prior Publication Data
US 2020/0083972 A1   Mar. 12, 2020

(30) Foreign Application Priority Data

Sep. 12, 2018   (IN) .............................. 201841026130

(51) Int. Cl.
*H04B 17/364* (2015.01)
*H04L 12/26* (2006.01)
*H04B 17/10* (2015.01)

(52) U.S. Cl.
CPC ......... *H04B 17/364* (2015.01); *H04B 17/104* (2015.01); *H04L 43/0858* (2013.01)

(58) Field of Classification Search
None
See application file for complete search history.

(56) References Cited

U.S. PATENT DOCUMENTS

| | | | |
|---|---|---|---|
| 2018/0246197 A1* | 8/2018 | Khojastepour | .... G06K 19/0723 |
| 2018/0275245 A1* | 9/2018 | Moshfeghi | ................ G01S 1/02 |
| 2019/0253282 A1* | 8/2019 | Hadaschik | .......... H04W 64/003 |

* cited by examiner

*Primary Examiner* — Saumit Shah

(57) ABSTRACT

A method of determining a total delay to a radio frequency (RF) signal caused by a path between a start point and an end point comprising, injecting a plurality of frequency tones at the start point, wherein the frequency tones are of different frequency, receiving the plurality of frequency tones at the end point, measuring a plurality phase differences corresponding to difference of phase between the plurality of frequency tones injected at the start point and the corresponding plurality of the frequency tones received at the end point, and determining a total delay to the RF signal caused by the path from at least more than one of the plurality of phase differences measured. The method further comprises determining a total phase shift to the RF signal from the total delay and a frequency of the RF signal.

6 Claims, 5 Drawing Sheets

METHOD, SYSTEM AND APPARATUS FOR CALIBRATION OF PHASED ARRAY RADIO FREQUENCY TRANSCEIVER

CROSS REFERENCES TO RELATED APPLICATIONS

This application claims priority from Indian patent application No. 201841026130 filed on Sep. 12, 2018 which is incorporated herein in its entirety by reference.

BACKGROUND

Technical Field

Embodiments of the present disclosure relate to determining a delay in a radio frequency (RF) signal processing path and more particularly relate to paths in a phased array transmitter and receivers of a wide band RADAR and communication system.

Related Art

Radio Frequency (RF) signal processing is generally performed on an electronic system such as integrated circuit, printed circuit boards (PCB), wired/cabled interconnected electronic systems etc. In all situations, the RF signals are passed from one processing component/element to another through the conducting or optical paths. For example, the RF signal received on an antenna is passed to number of electronic component/element through conducting cable and/or conducting path on a PCB and/or internal conducting layout on the integrated circuit (IC).

The processing elements like processor, analog digital converters, analog front end circuitry may be physically separated by a small distance (when all of them are on PCB for example) and/or a large distance (when the components are placed at different location like antenna system at one location and baseband at another location separated at least by a few (hundred) meters apart).

Due to the length (distance) of the path, the RF signal traversing the path experiences a delay or phase shift (used interchangeably). Further, elements performing operations on the RF signal may also introduce delay and phase shift. Such combined delay by path and elements (also simply referred to as path) may introduce an undesirable error in the result or outcome of a signal processing element. Calibration often refers to measurement and correction of such error to ensure post-correction error is small and outcome is desirable.

As is well known in the art, such delay due to path that are multiple wavelengths long is undesirable at least in a wideband phased array transmitter and receiver systems. In that, the phase angles of each RF signal are employed to form a RF beam for transmitting or to detect direction of arrival of RF signal. The undesirable phase/delay due to the path (that are multiple-wavelength long—hereafter referred simply as path) may result in a wrong direction of the transmit beam and/or in wrong determination of direction of arrival of RF signal. One conventional phased array system is described more fully in the book titled "Phased Array Antenna" by Robert C Hansen, published by Wiley in the year 2009, which is incorporated herein by reference.

In a conventional phased array system, phase error due to the path is reduced by calibrating the phased array system at least at every narrow band frequency of operation. As is well known in the art, a reference signal is transmitted through the desired path from one end to the other. The phase difference between the reference signal and the signal received at the other end of the path is used to calibrate the phased array systems. However, such conventional technique of correcting the phase error due to the path may be useful only when the overall phase shift/change caused by the path is within $2\pi$, as the phase wrap over $2\pi$ for the phase shift in excess of $2\pi$.

SUMMARY

According to an aspect of the present disclosure, a method of determining a total delay to a radio frequency (RF) signal caused by a path between a start point and an end point comprising, injecting a plurality of frequency tones at the start point, wherein the frequency tones are of different frequency, receiving the plurality of frequency tones at the end point, measuring a plurality phase differences corresponding to difference of phase between the plurality of frequency tones injected at the start point and the corresponding plurality of the frequency tones received at the end point, and determining a total delay to the RF signal caused by the path from at least more than one of the plurality of phase differences measured. The method further comprises determining a total phase shift to the RF signal from the total delay and a frequency of the RF signal.

Several aspects are described below, with reference to diagrams. It should be understood that numerous specific details, relationships, and methods are set forth to provide a full understanding of the present disclosure. One who skilled in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION OF THE PREFERRED EXAMPLES

Figure 1:
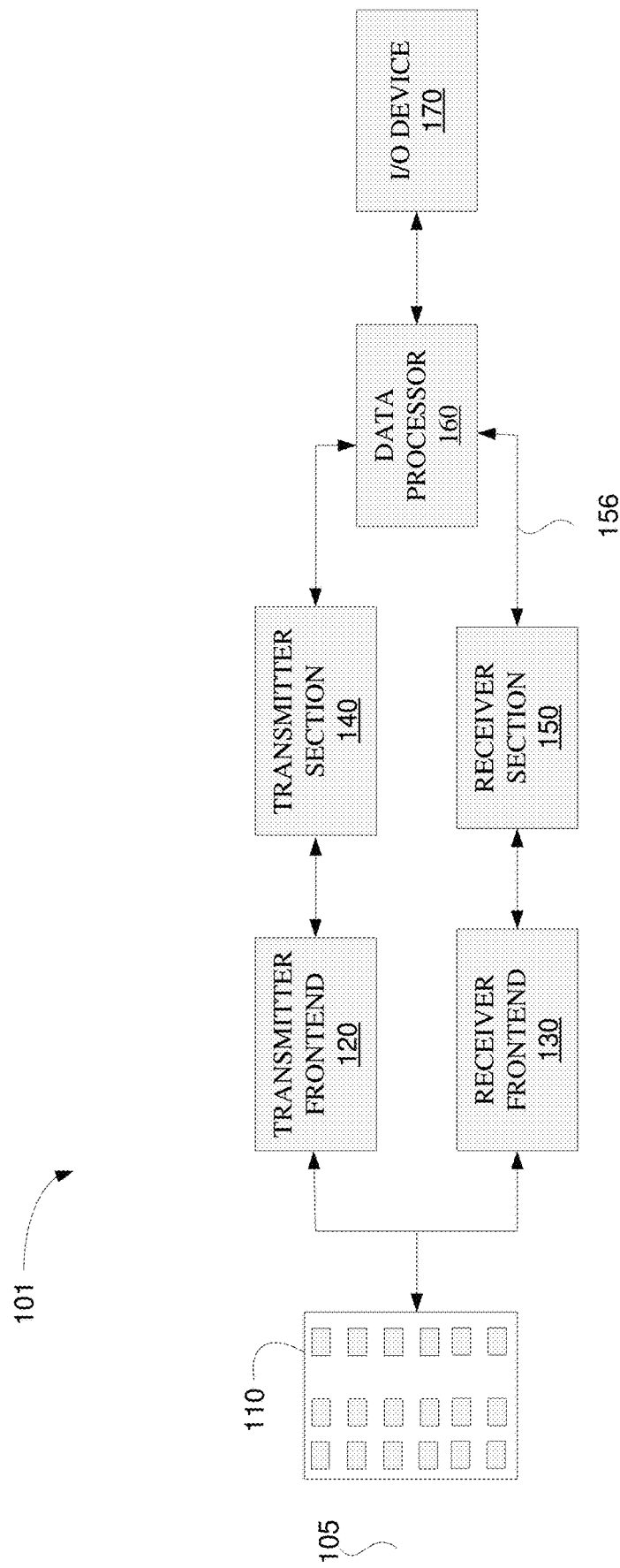
FIG. 1 is an example phased array RF transceiver system in an embodiment.

FIG. 1 is an example phased array RF transceiver system in an embodiment. The transceiver 101 is shown comprising antenna array 110, transmitter frontend 120, receiver frontend 130, transmitter section 140, receiver section 150, data processor 160, and input/output (I/O) devices 170. Each block is further described below.

The antenna array 110 operates to transmit and receive RF signal over the free space 105. The antenna array 110 may be a one, two or three-dimensional array. In that, elements may operate in a time domain divisional or frequency domain divisional manner to transmit and/or receive. Alternatively, the dedicated antenna elements may be interspersed in the array pattern for transmission and reception.

The transmitter frontend 120 perform RF signal processing and baseband signal processing on the signal to be transmitted over the antenna. Similarly, the receiver frontend 130 perform RF signal processing and baseband signal processing on the RF signal received on the antenna array 110. For example, the transmitter frontend 120 and receiver frontend 130 may perform one more operations such as amplification, frequency translation, modulation, impedance matching etc., to condition the RF signal (and the baseband signal) for transmission and further processing respectively.

The transmitter section 140 generates and provides a set of successively phase shifted version of a RF signal for transmission over the antenna array 110. As an alternative, the transmitter section may control the phase shift of each RF signal when phase shift is implemented in at RF section. The phase difference between the successively phase shifted signals of each RF signal causes an RF beam formed in a particular direction in the free space, when transmitted over the antenna array 110. Similarly, the receiver section 150 receives a set of RF signals from the antenna array 110. The receiver 150 determines the direction of the beam from the set of received RF signals by its phase angles. The beam direction and other information are provided for further processing on the path 156.

The data processor 160 provides a signal to the transmitter section 140 for transmission and receives a signal from the receiver 150 for further processing. In one embodiment, the data processor may perform object detection, object mapping, signal detection, signal selection etc. The I/O devices 170 provide various interfaces to external world. For example, the I/O devices 170 may comprise, display device for controlling and viewing the operation/result. Similarly, the I/O device 170 may comprise input devices like keypads, etc., for receiving the signal and commands for processing.

In one embodiment the transceiver 101 operate as 3G/4G/5G communication system. In that, the transceiver performs signal detection and selection by determining the channel from the direction of arrival/departure and transmits the beam to a specific direction respectively. In an alternative embodiment, the transceiver 101 may operate as RADAR system to detect objects. In that, the transmitter 140 and receiver 150 perform beam forming to respectively transmit the RF signal in a desired direction and receive a RF signal in the desired direction.

In one embodiment, transmitter frontend 120, receiver frontend 130, the transmitter 140, receiver 150 and data processor 160 may be implemented as single system on chip (SOC) integrated circuit device that may be physically at different distance from each antenna element in the antenna array 110.

Alternatively, one or more elements antenna array 110, transmitter frontend 120, receiver frontend 130, the transmitter 140, receiver 150 and processor 160 may be built over a print circuit board (PCB) thereby causing different conductive distance from the transmitter section 140/receiver section 150 to antenna elements in the antenna array 110.

As a further alternative, the antenna array 110 and transmitter frontend 120/receiver frontend 130 may be deployed at distance (a few meters to a few hundred meters) from the transmitter section 140/receiver section 150 and coupled through conductive/optical cables.

Figure 2:
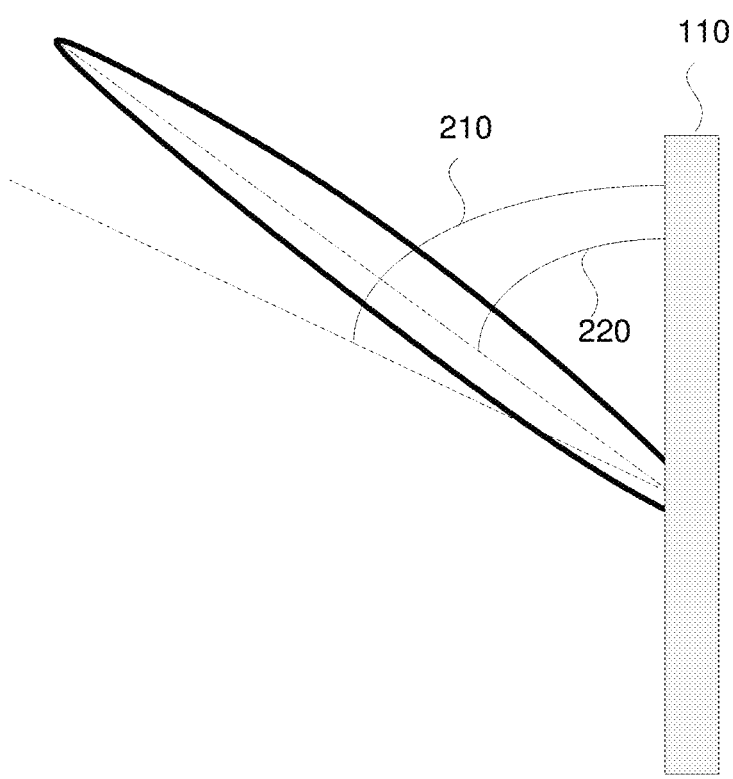
FIG. 2 illustrates the error due to path length in one embodiment.

FIG. 2 illustrates the error due to path length in one embodiment. As shown there the direction 210 represents the desired direction at an angle $\psi_1$. The direction 220 represents the actual direction at an angle $\psi_2$. The error $\psi_2 \sim \psi_1$ (the difference) represents the phase angle (phase shift or delay) caused by the path from antenna array to transmitter section/receiver section. Accordingly, in one embodiment, the phase shift due to the un-calibrated path is determined and compensated (calibrated) to overcome the error.

Figure 3A:
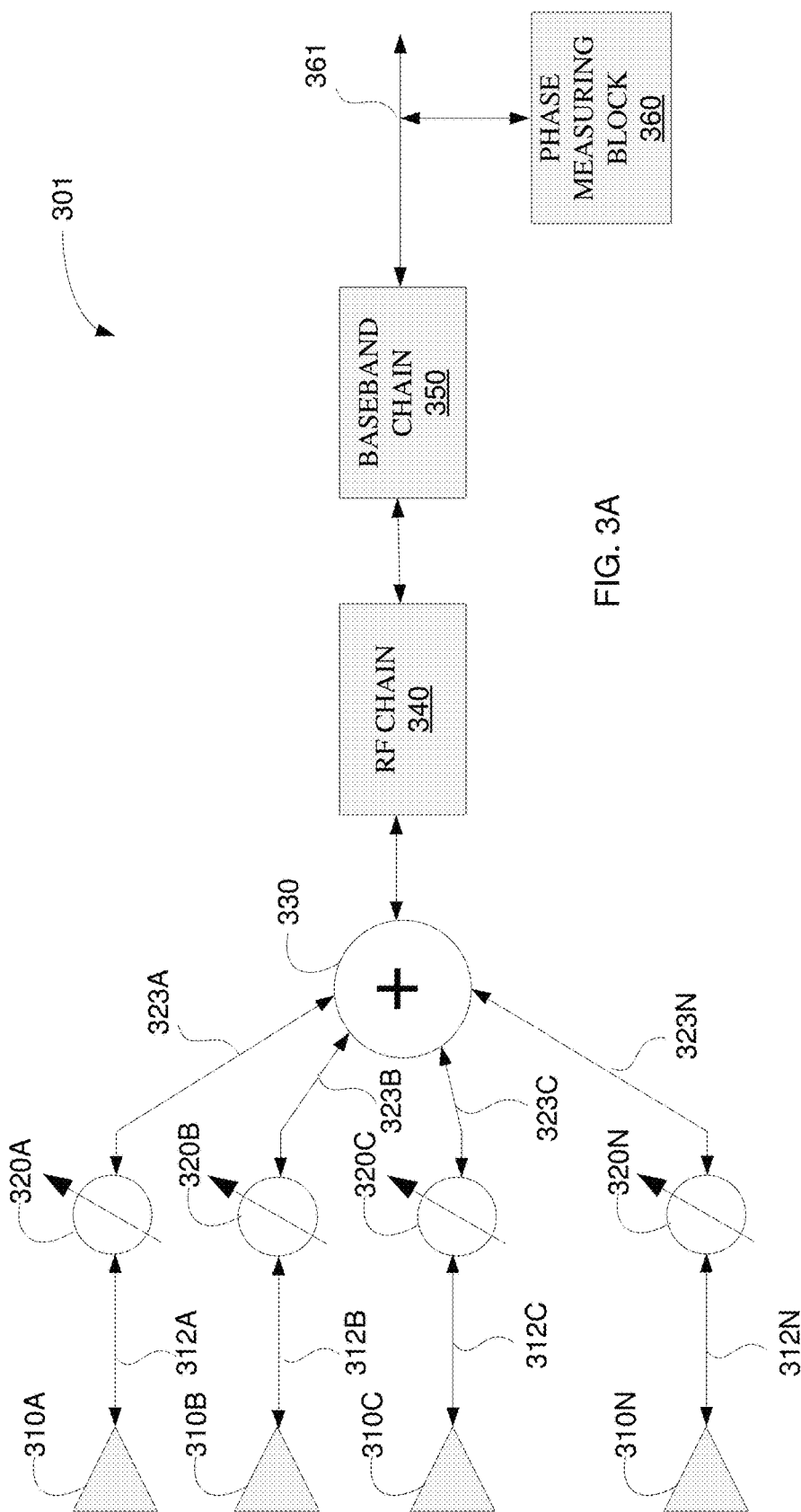
FIG. 3A is a block diagram illustrating calibration of phased array system in an embodiment.

FIG. 3A is a block diagram illustrating calibration of phased array system in an embodiment. The system 301 is shown with antenna array 310A-310N, RF signal weights 320A-N, combiner 330, RF chain 340, baseband (BB) chain 350, and phase measuring block 360. In that, antenna array 310A-310N is configured to receive the RF signal from free space 305. The RF signal weights 320A-320N represent the change in phase angle and the amplitude of the RF signals received by the respective antenna elements 310A-310N on the point's 312A-312N. The phase angle of the RF signal weights 320A-320N may be respectively represented as $\Phi_1$, $\Phi_2$, $\Phi_3$ ... $\Phi_N$.

The combiner 330 combines the RF signals on paths 323A-323N to form a combined RF signal. The combiner 330 may simply add the phase shifted RF signals received on path 323A-323N. The combiner may perform any other known combining operation as in 4G, 5G and MIMO radar systems.

The RF chain 340 perform RF signal processing on the combined RF signal. The RF signal processing may comprise low noise amplification, filtering, signal conditioning and mixing operations for example. The RF chain 340 may comprise more than one processing elements coupled serially, in parallel and/or both. The baseband (BB) chain 350 translates the combined RF signal to baseband frequency and performs known baseband signal conditioning prior to extracting the desired information from the baseband signal. As an example to the extracting desired information, the conditioned baseband signal may be provided to the receiver section 150 to determine the phase angle of each RF signal and detect the direction of arrival of RF signal in the free space 305. However, the phase of the RF signals traversing respective un-calibrated paths from points 312A-312N to 361 gets shifted by unknown phase depending on the path length at least. For example, the RF signal on path 323A with phase $\Phi_1$ of may measure/exhibit a different phase at point 361. Accordingly, the each RF signal traversing a path from point 323A-N to point 361 experience change in its phase angle that may be different at least for the reason that the distance between the point's 323A-N and 361 may be different for each RF signal 312A-312N.

Moreover, when the uncalibrated paths are multi-wavelength long, the phase shift caused by the path may be more than 360 degrees or $2\pi$ radians. Thus, phase shift would wrap around $2\pi$ radians multiple times depending on the length. The quantification of this multi-wavelength delay is crucial at least in wide-band beam-formers. As wrong delay information can cause error in the desired angle as illustrated in FIG. 2.

The phase measuring block 360 measures the phase angle of the RF signals at point 361. The phase angle measured may be different from the received phase angle of the RF signal at point 312A-312N at least for the reasons recited above. In one embodiment, the phase measuring block 360 determines the change in phase caused due to the path more accurately (including the multiple phase wrap around $2\pi$ radians) and applies the measured phase angle for correcting the error. The manner in which phase measuring block may determine the change in phase angle due to the path is described in further detail below with an example of one path. The same may be applied for other paths as well.

Figure 3B:
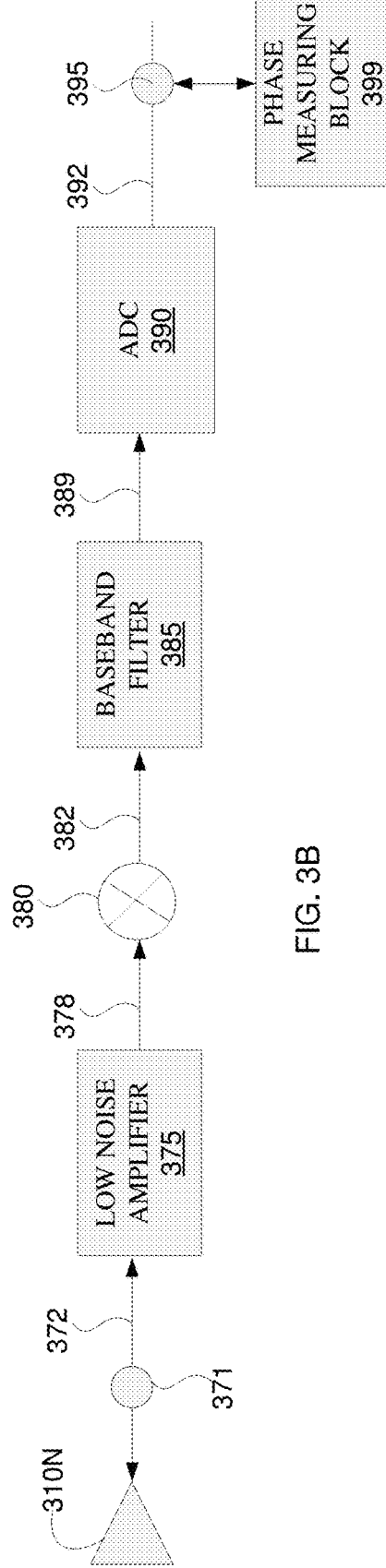
FIG. 3B illustrates an example path traversed by each RF signal received on the antenna element.

FIG. 3B illustrates an example path traversed by each RF signal received on the antenna element (310A for example). As shown there, the path begins at point 371. The RF signal traverse path 372 to reach low noise amplifier 375. Thus, the amplified RF signal traverse path 378 to reach the mixer 380 (local oscillator not shown). Thus, the base band converted RF signal traverse path 382 to reach baseband filter 385. Thus, the filtered RF signal traverse path 389 to reach ADC 390. The digital RF signal traverse path 392 to reach point 395. The point 395 may represents an input to the receiver section 150 that extract information such as phase angle of the RF signal and determine the direction of arrival of the RF signal. Accordingly, it is necessary to provide the accurate RF signal (as received at point 371) to the receiver section for accurate determination of angle of arrival. The manner in which error caused due to the path between 371 is measured more accurately so that, system 301 may be calibrated to overcome the error is further described below.

In one embodiment, a test RF signal is injected at point 312A-312N and the phase angle is measured at point 361 to determine the phase change caused by the path from 312A-312N to point 361. With respect to FIG. 3B, the test RF signal is injected at the point 371 and the measurement of the phase is performed at point 395. The manner in which the phase angle/time delay caused by the path between 371 and 395 is further described below.

Figure 4:
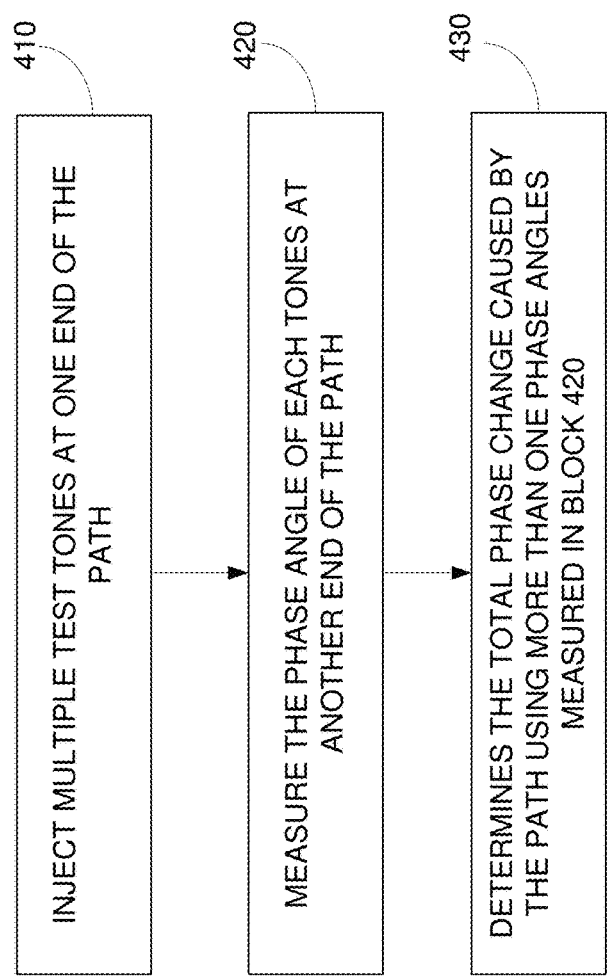
FIG. 4 is a block diagram illustrating the manner in which the phase angle change caused by a path may be measured accurately in an embodiment.

FIG. 4 is a block diagram illustrating the manner in which the phase angle change caused by a path may be measured accurately in an embodiment. In block 410, multiple test tones (frequency) are injected one at a time on one end of the path. For example, multiple signals each with different frequencies are injected at point 371. The test tones with frequency $f_1$, $f2$, ... $f_n$ injected at point 371 may be represented as $A \sin 2\pi f_1 t$, $A \sin 2\pi f_3 t$, ... $A \sin 2\pi f_3 t$, ... $A \sin 2\pi f_n t$ for example (alternatively same may be expressed in the exponential form as is well known).

In block 420, the phase measurement block 399 measures the phase angle of each tone at point 395. The phase measurement block 399 may compare the test tones at 371 with the corresponding received signals at point 395 to determine the phase difference (change). The phases difference measured by the phase measurement block 399 for each tone may be represented as $\phi_1, \phi_2, \ldots \phi_n$. The measured phase difference $\phi_1, \phi_2, \ldots \phi_n$ may be within $2\pi$ as the any phase change in excess of $2\pi$ is not measured as phase change wrap around $2\pi$.

In block 430, the phase measurement block 399 determines the total phase change caused by the path 371 to 395. In one embodiment, the phase measurement block 399 employ at least more than one measured phase differences $\phi_1, \phi_2, \ldots \phi_n$ of tones $A \sin 2\pi f_1 t$, $A \sin 2\pi f_2 t$, $A \sin 2\pi f_3 t$, ... $A \sin 2\pi f_n t$ to determine the total phase change and/delay caused by the path between 371 and 395. The manner in which the total phase shift in excess of $2\pi$ (unwrapping the phase) is performed is further described below.

Considering the signal $A \sin 2\pi f_1 t$ is injected at point 371, the signal received at the point 395 with a delay $\tau$ may be represent as, $A \sin 2\pi f_1 (t-\tau)$. Accordingly, the total phase due to delay $\tau$ may be represented as $2\pi f_1 \tau$. The value of $2\pi f_1 \tau$ may be in excess of $2\pi$ and integer multiples ($_{m1}$) thereof. Accordingly, the phase $\phi_1$ measured by phase angle measurement block 399 for tone $f_1$ may be represented as: $\phi_1 = 2\pi f_1 \tau - 2\pi m_1$.

Similarly, the phase angle $\phi_2$ measured for second tone $f_2$ injected at point 371 may be represented as: $\phi_2 = 2\pi f_2 \tau - 2\pi m_2$. Accordingly, for $n^{th}$ tone $f_n$ the phase measured by the phase angle measurement block 399 may be represented as: $\phi_n = 2\pi f_n \tau - 2\pi m_n$. In that, $m_1, m_2 \ldots m_n$ are integers representing the number of $2\pi$ wraps.

The relation between measured phase $\phi_1, \phi_2, \ldots \phi_n$, the total delay $\tau$ and the integer number of wraps $m_1, m_2 \ldots m_n$ may represented in the matrix relation as:

$$\begin{bmatrix} -1 & 0 & 0 & 0 & \ldots & f_1 \\ 0 & -1 & 0 & 0 & \ldots & f_2 \\ & & \vdots & & & \\ 0 & 0 & 0 & -1 & \ldots & f_n \end{bmatrix} \begin{bmatrix} m_1 \\ m_2 \\ \vdots \\ m_n \\ \tau \end{bmatrix} = \frac{1}{2\pi} \begin{bmatrix} \varphi_1 \\ \varphi_2 \\ \vdots \\ \varphi_n \end{bmatrix} \quad (1)$$

The relation (1) represents the set of linear functions. In one embodiment, the relation (1) is employed to determine $\tau$ using mixed linear programming optimisation technique. In that, the values of the integer number of wraps $m_1, m_2 \ldots m_n$ are selected such that the cost function $C^T x$ is maximised under set of conditions. In one embodiment, the linear programming optimisation technique as described in the book titled "Theory of Linear and Integer Programming" by Alexander Schrijver and published by Wiley in the year 1998, which is incorporated herein by reference may be employed.

Briefly, the cost function $C^T x$ is maximised under the conditions (inequality constraints):

$$Ax + s = b, x \geq 0, s \geq 0, x \in Z^n. \quad (2)$$

wherein C is cost vector of order (1×n), A is coefficient matrix of the order (m×n) as in the left-hand side of relation 1, b is the condition matrix of the order (m×1) as in right hand side of the relation 1. However, the solution for mixed liner programming or integer linear programming exists on the edge of the simplex created by the inequality constraints.

In one embodiment, the phase measurements block 399 splits the solution space $Z^n$ into multiple sub-spaces (simplex created by sub-set of the linear constraints) and determines solutions that satisfy constraints within sub-spaces first and then to get the final solution from the intersection of the solutions obtained from multiple sub-spaces. As a result, the search space for finding matching values for $m_1$, $m_2 \ldots m_n$ within the sub-space is reduced. The phase measurement block 399 determines the final solution value of $m_1, m_2 \ldots m_n$ and $\tau$ as an intersection of the solution obtained from the sub-spaces.

For example, the phase measurement block 399 may determine the $\tau$ for two tones $A \sin 2\pi f_1 t$, and $A \sin 2\pi f_2 t$. Accordingly, the $\tau$ may be represented as:

$$\tau = \frac{2\pi(m_1 - m_2) + (\varphi_1 - \varphi_2)}{(2\pi f_1) - (2\pi f_2)} \quad (3)$$

In that, the subspace for $m_1 - m_2$ is much smaller compared to entire solution space $Z^n$ of $m_1, m_2 \ldots m_n$. Accordingly, the phase measurement block 399 select $m_1$ $m_2$ that are closer to the approximate distance of the length. In one embodiment, few values of $m_1$, $m_2$ are stored as most probable values.

The most probable values may be determined based on the frequency of the tones (wavelength) and approximate length of the path between 371 and 395. For example, in case of a system 301 is built over a PCB the path length may be set to an approximate value of 0.1 meters. Thus, when the frequency of the tones is 10 Ghz and 11 Ghz, the integer multiples $m_1$ and $m_2$ may be selected an integer values less than 10. Accordingly, the values of $m_1-m_2$ may be selected within an integer value less than 3 (forming a subspace value for $m_1-m_2$).

As an alternative example, in case of a system 301 is distributed over 100 meters, the path length may be set to an approximate value of 10 meters. Thus, when the frequency of the tones is 10 Ghz and 11 Ghz, the integer multiples $m_1$ and $m_2$ may be selected between an integer values greater than 600 and less than 750. Accordingly, the values of $m_1-m_2$ may be selected an integer value less than 150 (forming a subspace value for $m_1-m_2$)

In a similar way, the most probable value for the other tones may be selected to form a subspace. Accordingly, $\tau$ is determined for every pair in the relation (1) using relation (3) as $\tau_1$, $\tau_2$ etc. The intersection of these solution sets is taken as final value of the $\tau$ for path between 731 and 795. In one embodiment, the intersection value is taken as mean of the solutions, i.e. the mean of the $\tau_1$, $\tau_2$ etc.

Accordingly, the total phase shift is determined as $2\pi f \tau$, wherein the f representing the frequency of the RF signal received on the respective antenna (310N). In a similar fashion, the overall delay and the phase shift is determined for each path 312A-312N to 361. In one embodiment, the receiver section 150 determines the direction of arrival after correcting the measured phase with the total phase shift $2\pi f \tau$ determined by the phase measurement block 399/360. The manner in which transmitter path may be calibrated is further described below.

As may be seen the transmitter section 140 generates N number of (say N antenna elements) the phases shifted RF signals to form a beam in the desired direction. However, the phase shift set to each RF signal by the transmitter section 140 may get altered as the RF signal traverse through the transmitter frontend 120 and reach the antenna elements 110. Thereby forming the transmit beam in a direction different (error) than the desired direction (as illustrated in FIG. 2). Thus, in order to reduce the error, the transmitter section 140 require to set the phase angle of each RF signal considering the phase change it undergo as it traverse path till the antenna 110.

Figure 5:
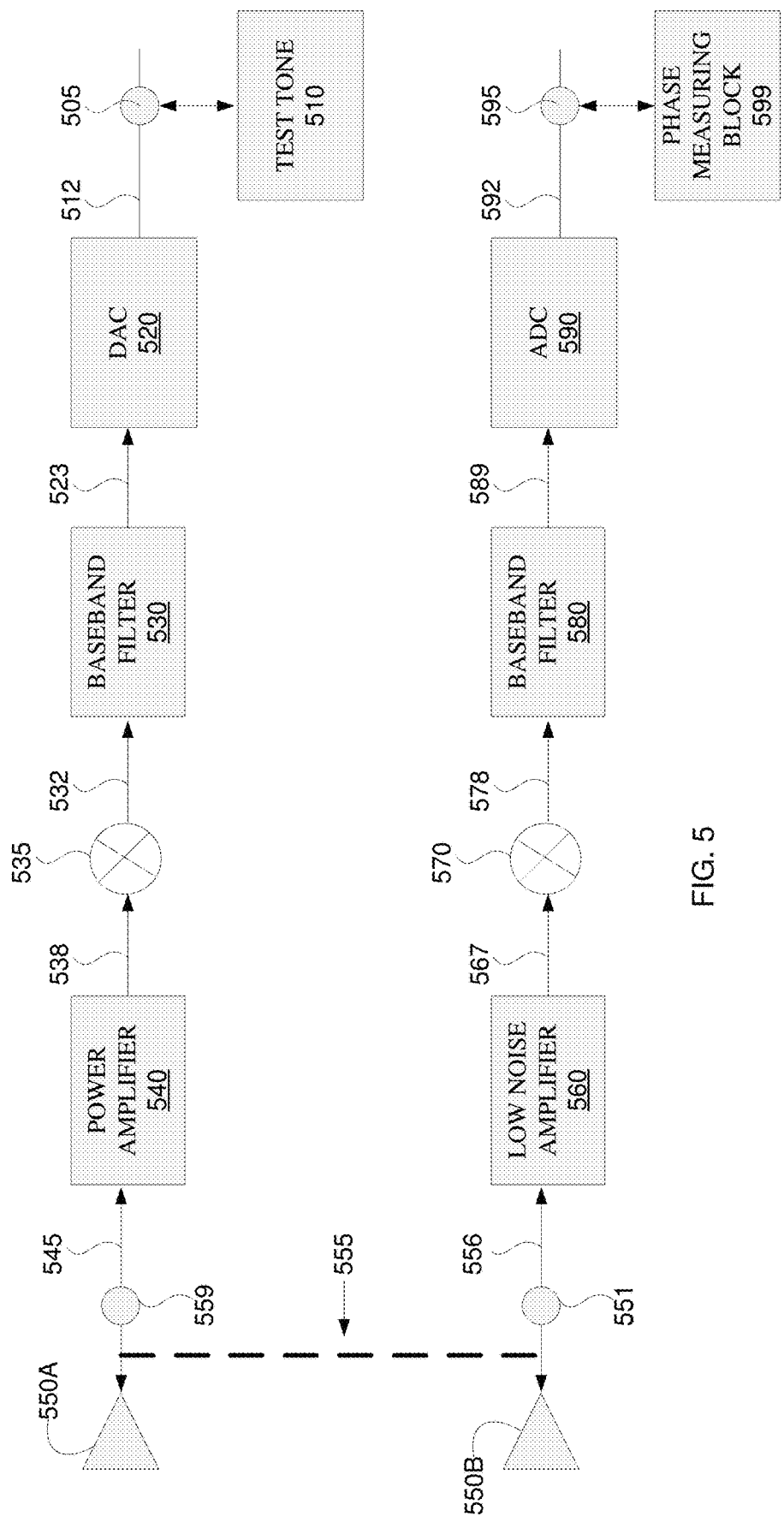
FIG. 5 is a block diagram illustrating the manner in which a total phase shift caused by the transmit path is determined in one embodiment

FIG. 5 is a block diagram illustrating the manner in which a total phase shift caused by the transmit path is determined in one embodiment. In that, path between points 505 and 559 represents the transmitter path. The transmitter path is shown comprising digital to analog converter (DAC) 520, baseband filter 530, mixer 535 and power amplifier 540. The DAC 520 converts the signal on path 512 (information in digital bits) to be transmitted over antenna 550A to analog form. The signal on path 512 may be received from transmitter section 140. The analog signal is presented on the path 523.

The baseband filter 530 operates to remove undesired noise and harmonics generated at the DAC to generate a baseband signal on path 532. The mixer 535 converts the filtered baseband signal on path 532 to high frequency RF signal on path 538. The mixer 535 may mix the signal on path 532 with a local oscillator (a reference signal not shown) signal to up convert the baseband signal. The up converted signal is provided on path 538.

The power amplifier 540, enhance the power of the signal on path 538 to appropriate level for transmission over the antenna 550A. The power amplified RF signal is transmitted over antenna 550A. Antenna 550A forms one of the antenna elements in the antenna array 110. Accordingly, the path between the points 505 and 559 represents the path traversed by each RF signal transmitted over the antenna elements of the array 110.

The path between points 551 and 595 represents the receiver path similar to the path between point 371 and 395 described in the sections above. Accordingly, the elements LNA 560, mixer 570, baseband filter 580 and ADC 590 operate similar to the elements 375, 380, 385, and 390 respectively.

In one embodiment, the coupling path 555 is a leakage path, which provides a fraction of the Tx signal at the point 559 of the Rx chain which was calibrated already. In one embodiment, a separate Rx chain called auxiliary receiver is used with respect to which all Rx chain and Tx chains are calibrated.

In one embodiment, after determining the total delay of the path between 551 and 595 (same as path between 371 and 395), the phase measurement block 599 determines the total delay between points 505 and 595 via coupling 555. In one embodiment, transmit path delay is determined by subtracting the total delay between path 551 and 595 from a total delay measured between path 505 and 595. The manner in which the total delay between path 505 and 595 may be measured in an embodiment is further described below.

The test tone 510 is injected at the point 505. The test tone 510 comprises plurality of tones with frequency $f_1$, $f_2$, ... $f_n$ similar to the test tones injected at point 371. The point 559 and 551 are coupled to divert the test tone 510 to the receiver path. As a result, the test tone 510 traverses transmitter path (505 to 559) and receiver path (551 to 595) through coupling 555.

The phase measuring block 599 determines total delay in the transmitter and receiver path by employing the techniques described with in the section above. Since the delay due to receiver path between 551 and 595 (same as 371 to 395) is determined and stored in a memory, the delay caused by the transmitter path 505 to 559 is determined as $\tau_{Tx}=\tau_{Total}-\tau_{Rx}$. In that $\tau_{Total}$ representing the delay measured by phase measurement block 599 when the test tone 510 is injected at point 505 and the coupling 555 connects the point 559 with 551. The $\tau_{Rx}$ representing the delay measured by the phase measurement block 399 when test tones are injected at the point. The $\tau_{Tx}$ representing delay caused by the transmit path between point 505 and 559. Further, delay due to couple 555 may also be subtracted to determine the $\tau_{Tx}$ as: $\tau_{Tx}=\tau_{Total}-\tau_{Rx}-\tau_{555}$. In that, $\tau_{555}$ representing the delay caused by the couple which may be pre-determined.

In one embodiment, the transmit section 140 determines the total phase shift caused by the transmit path for a signal of frequency $f_t$ as $2\pi f \tau_{Tx}$. The transmit section adjust (calibrates) the phase angle of the RF signal of each antenna element in the array 110 to reduce the error in the direction of the beam formed in the free space 105.

While various embodiments of the present disclosure have been described above, it should be understood that they have been presented by way of example only, and not limitation. Thus, the breadth and scope of the present disclosure should not be limited by any of the above-discussed embodiments but should be defined only in accordance with the following claims and their equivalents.

What is claimed is:

1. A method of determining a total delay to a radio frequency (RF) signal caused by a path between a start point and an end point comprising:
   injecting a plurality of frequency tones at the start point, wherein the frequency tones are of different frequency selected independent of length of the path;
   receiving the plurality of frequency tones at the end point;
   measuring a plurality phase differences corresponding to difference of phase between the plurality of frequency tones injected at the start point and the corresponding plurality of the frequency tones received at the end point;
   determining a total delay to the RF signal caused by the path from at least more than one of the plurality of phase differences measured;
   determining a total phase shift to the RF signal from the total delay and a frequency of the RF signal,
   wherein the plurality of frequency tones are of frequencies $f_1, f_2, f_3, \ldots f_n$ and the plurality of corresponding phase differences are $\varphi_1, \varphi_2, \ldots \varphi_n$, in that each phase difference $\varphi_1, \varphi_2, \ldots \varphi_n$ is less than $2\pi$ and the total delay is determined from a first relation:

$$\begin{bmatrix} -1 & 0 & 0 & 0 & \ldots & f_1 \\ 0 & -1 & 0 & 0 & \ldots & f_2 \\ & & \vdots & & & \\ 0 & 0 & 0 & -1 & \ldots & f_n \end{bmatrix} \begin{bmatrix} m_1 \\ m_2 \\ \vdots \\ m_n \\ \tau \end{bmatrix} = \frac{1}{2\pi} \begin{bmatrix} \varphi_1 \\ \varphi_2 \\ \vdots \\ \varphi_n \end{bmatrix},$$

in that, $m_1$ through $m_n$ representing a number of wraps over $2\pi$ of the phase shift and are integers.

2. The method of claim 1, further comprising:
   selecting a first set of linear relation comprising at least more than one linear relation from the first relation to form a second relation comprising a first set of wraps, a first set of phase differences corresponding to first set of frequency tones;
   selecting a first set of integer values for the first set of wraps; and
   determining a first delay from the second relation by applying the first set of integer values.

3. The method of claim 2, wherein the second relation is:

$$\tau_1 = \frac{2\pi(m_1 - m_2) + (\varphi_1 - \varphi_2)}{(2\pi f_1) - (2\pi f_2)}$$

in that, $\tau_1$ representing the first delay, f1 and f2 representing the first set of frequency tones, m1 and m2 representing the first set of wraps, and $\varphi$1, and $\varphi$2 representing the first set of phase differences.

4. The method of claim 3, further comprising:
   selecting a second set of linear relation comprising at least more than one linear relation from the first relation to form a third relation comprising a second set of wraps, a second set of phase differences corresponding to a second set of frequency tones;
   selecting a second set of integer values for the second set of wraps; and
   determining a second delay from the third relation by applying the second set of integer values to the second set of wraps.

5. The method of claim 4, wherein the third relation is:

$$\tau_2 = \frac{2\pi(m_3 - m_4) + (\varphi_3 - \varphi_4)}{(2\pi f_3) - (2\pi f_4)}$$

in that, $\tau_2$ representing the second delay, $f_3$ and $f_4$ representing the second set of frequency tones, $m_3$ and $m_4$ representing the second set of wraps, and $\varphi_3$, and $\varphi_4$ representing the second set of phase differences.

6. The method of claim 5, further comprising determining the total delay as mean of the first delay and the second delay.

* * * * *